April 6, 1965 A. L. HUBBARD 3,176,451
CROP HARVESTER
Original Filed Sept. 9, 1960 4 Sheets-Sheet 1

INVENTOR.
ARTHUR L. HUBBARD
BY William A. Murrey
ATTORNEY

April 6, 1965     A. L. HUBBARD     3,176,451
CROP HARVESTER

Original Filed Sept. 9, 1960     4 Sheets-Sheet 4

INVENTOR.
ARTHUR L. HUBBARD
BY William A. Murray
ATTORNEY ature of the invention is better understood from the
United States Patent Office 3,176,451
Patented Apr. 6, 1965

3,176,451
CROP HARVESTER
Arthur L. Hubbard, Des Moines, Iowa, assignor to Deere & Company, Moline, Ill., a corporation of Delaware
Continuation of application Ser. No. 54,895, Sept. 9, 1960. This application Sept. 17, 1962, Ser. No. 226,476
26 Claims. (Cl. 56—14)

This invention relates to a crop harvester and more particularly to the arrangement of the various elements composing the harvester in relation to the main supporting frame of the harvester.

This is a continuation of application Ser. No. 54,895, filed September 9, 1960 and now abandoned.

Conventionally the main supporting structure for a cotton harvester is composed of an elongated main frame supported by a pair of forwardly positioned and transversely spaced apart traction wheels which run outside of a pair of adjacent and parallel rows of cotton plants. Cotton harvesting mechanism extends forwardly from the main frame and is generally positioned between the transversely spaced traction wheels so as to harvest in many instances two rows of cotton plants between the wheels. The harvesting units are composed of housing structure which forms fore-and-aft extending plant passageways for receiving the respective rows as the harvesters advances. Supported in the housing structure are picking elements which extend laterally into the passageways to pick the cotton from the plants. Also provided in the housing structures are cotton removing means usually in the form of doffing mechanisms and a suction type discharge conveyor which operates to remove cotton from the cotton picking elements and convey the cotton to a cotton receptacle, also carried by the main supporting frame. It has been conventional, therefore, in the past to provide picking mechanism for simultaneously picking two rows of cotton which is generally contained between the inner faces of the transversely spaced traction wheels.

It is the purpose of the present invention to provide a crop harvester, which for purposes of illustration will be a cotton harvester, which will simultaneously pick crops from four adjacent rows, two rows of which are between the inner faces of the traction wheels and two of which are outwardly of and adjacent the outer faces of the traction wheels. While the invention is shown and described as utilized in a cotton harvester, many of the principles of the invention may be utilized in other types of harvesters. Therefore, the invention, unless specifically provided is not necessarily intended to be limited to use in a cotton harvester. It is also proposed to provide transversely projecting framework to be mounted rearwardly of the main traction wheels and on the main supporting frame. The transverse frames will project outwardly beyond the transverse expanse of the forward traction wheels and will carry at their outer end forwardly projecting outboard harvesting mechanism which will gather and harvest the rows of plants outwardly respectively of the forward or main traction wheels.

For harvesting each row of plants, there is conventionally provided picking elements in the housing structures which extend laterally into the passageways to pick the cotton from the plants. Normally the picking elements are carried on drums which rotate about upright axes on opposite sides of the plant passage. The drum which first encounters the cotton plant is normally positioned forwardly of the drum on the opposite sides of the passage and generally contains more picking elements and is generally, therefore, considered the high capacity picking unit since it does remove the majority of the cotton from the plants. The drum on the opposite side of the passage is considered the low capacity drum since it will pick only the remaining cotton on the plants. Generally, therefore, the high-capacity drum is heavier and the portion of the picker housing which contains the high-capacity drum is heavier and larger than the housing structure on the opposite side of the passage. It is therefore important from a weight distribution standpoint to adequately balance the weights of the various picking mechanisms relative to the main frame of the harvester. It therefore follows and it is a further main purpose of the present invention to adequately position the high capacity or heavier picking drums in the outboard harvesting units inwardly relative to the main frame and to position the lighter low-capacity harvesting units outwardly relative to the high capacity units.

It is proposed to provide transverse rockshafts on the main frame with forwardly projecting lift arms mounted thereon which are connected to and operate to raise and lower the harvesting units inboard of the traction wheels. It is further proposed to provide rockshafts on the transversely extending framework with lift arms extending to the outboard and rearwardly positioned harvesting mechanisms. Linkage extending between the rockshafts supporting the forward and inboard mechanisms and the rockshafts supporting the outboard and rearward harvesting mechanisms will effect raising and lowering of the harvesting mechanisms in unison. Since it is deemed desirable to individually raise the harvesting mechanism on the right- and left-hand of the fore-and-aft center line of the main frame, the connecting linkage will be so provided that the inner and outer harvesting mechanisms on the right-hand side and the inner and outer harvesting mechanisms of the left-hand side of the main frame will be raised and lowered in unison.

It is further proposed as part of the present invention to provide adequate conveying means for moving the harvested cotton to the receptacle. It is therefore proposed to provide for four suction fans which will draw the cotton from the respective harvesting mechanism and transfer the cotton to an enlarged cotton receptacle.

Other objects and purposes of the present invention will become apparent to those skilled in the art as the nature of the invention is better understood from the following disclosure and as shown in the accompanying drawings.

Figure 1:
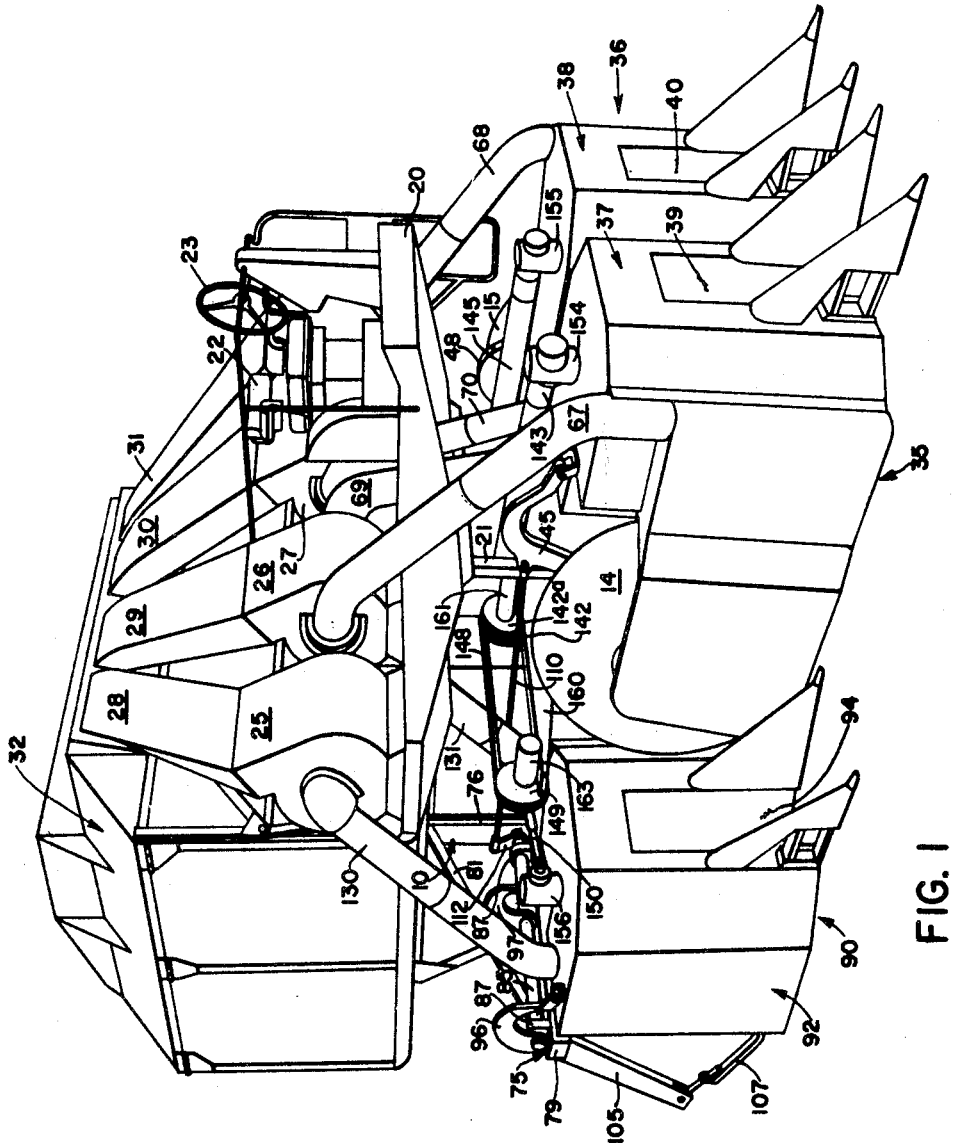
FIG. 1 is a perspective view of the cotton harvester as viewed from the front and right side of the harvester.
Figure 2:
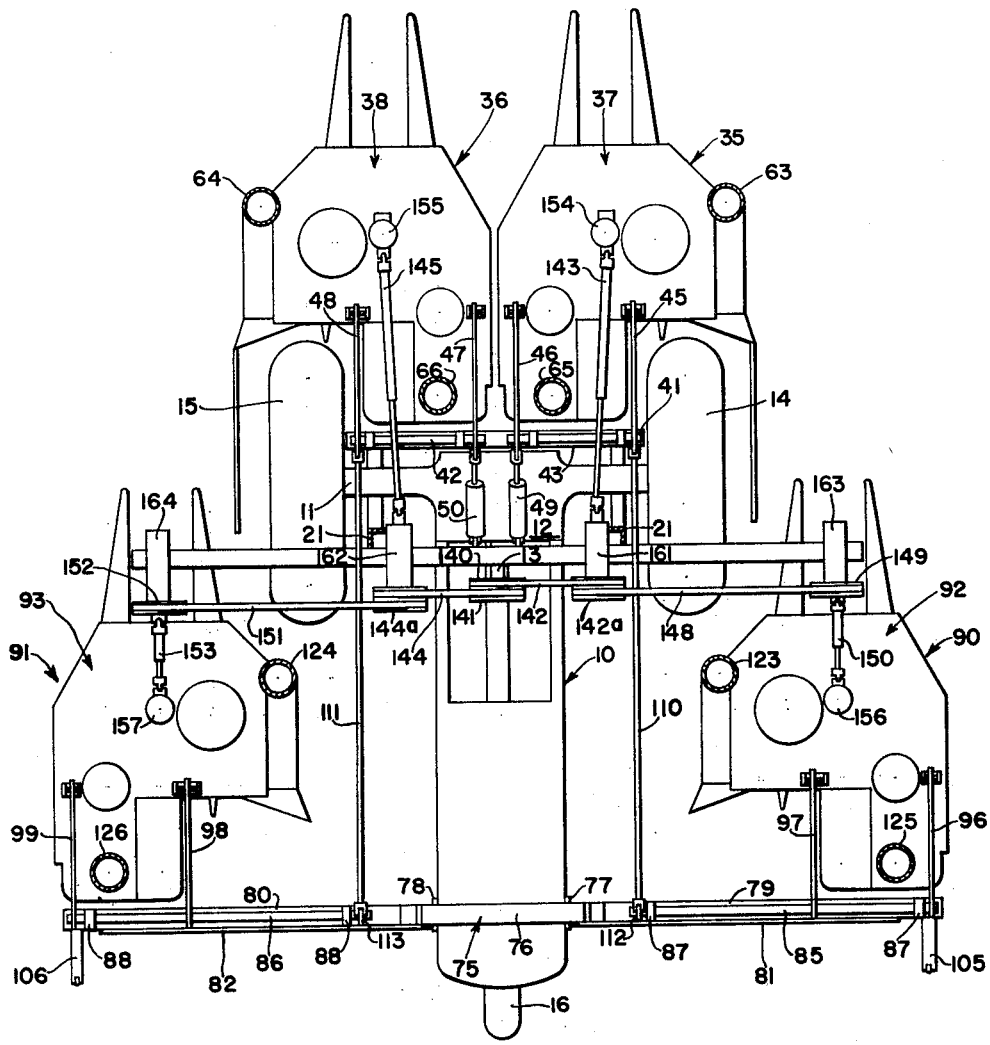
FIG. 2 is a plan view of the harvester with the cotton receptacle and its associated suction conveying system not being shown.

Referring now to the drawings, there is provided a main mobile frame composed of a fore-and-aft extending elongated body 10 supported at its forward end by transverse axle structure 11 including a centrally located differential drive 12 having a rearwardly extending power take-off shaft 13. The transverse axle structure 11 has right- and left-hand support or traction wheels 14, 15 respectively at opposite ends to carry the machine forwardly over the row-planted field. The right- and left-hand wheels 14, 15 are also disposed to run between pairs of plant rows to the right and left respectively of the fore-and-aft center line of the main frame 10. The traction wheels 14, 15 also run between rows of plants and consequently relative to each of the wheels 14, 15 there will be a row of plants closely adjacent to its innerface and closely adjacent to its outer face. The main mobile frame or body 10 is supported at its rear end by a single wheel 16 making the entire frame 10 supported on a tricycle type support. The wheel 16 may be turned for purposes of guiding the mobile frame 10 over a field. The main frame or body 10 supports a platform 20 by means of an upright structure, indicated in its entirely by the reference numeral 21. The platform 20 carries an operator's station indicated by the seat 22, which faces steering mechanism 23. Other control levers and mechanism for the harvester are positioned adjacent the operator's station. The mobile frame has a hydraulic system of the conventional type utilized for various functions such as power raising and lowering the harvesting mechanisms.

Supported on the platform 20 rearwardly of the seat 22 are four transversely alined and transversely spaced apart blower housings, three being shown at 25, 26, 27. The blower housings are provided with discharge ducts shown at 28, 29, 30 and 31 which operate to blow cotton into a receptacle indicated in its entirety by the reference numeral 32. Each of the blower housings are provided with a pair of oppositely disposed intake inlets which, as will later become apparent, operate as suction inlets for the blowers.

Positioned forwardly of the axle structure 11 are right- and left-hand harvesting units 35, 36. The harvesting units 35, 36 are composed of housing structures 37, 38 respectively defining fore-and-aft extending plant passageways 39, 40 respectively which receive the rows of plants inwardly or inboard of the right- and left-hand wheels 14, 15. The housing structures 37, 38 are supported on the main frame or body 10 by means of transverse rockshafts 41, 42 axially alined and positioned adjacent to and slightly forwardly of the axle structure 11. The rockshafts 41, 42 are supported on the main frame 10 by means of supporting framework 43. Forwardly projecting lift arms 45, 46 and 47, 48 are fixed to the rockshafts 41, 42 and are connected to the housings 37, 38. The inner lift arms 46, 47 are arched and are connected to hydraulic cylinders 49, 50. The cylinders 49, 50 are controlled from the operator's station and operate to raise and lower the right- and left-hand harvesting units 35, 36. The hydraulic system provided in the harvester is such that the cylinders 49, 50 may operate individually so that the right- or left-hand units 35, 36 may be raised independently of one another.

Figure 3:
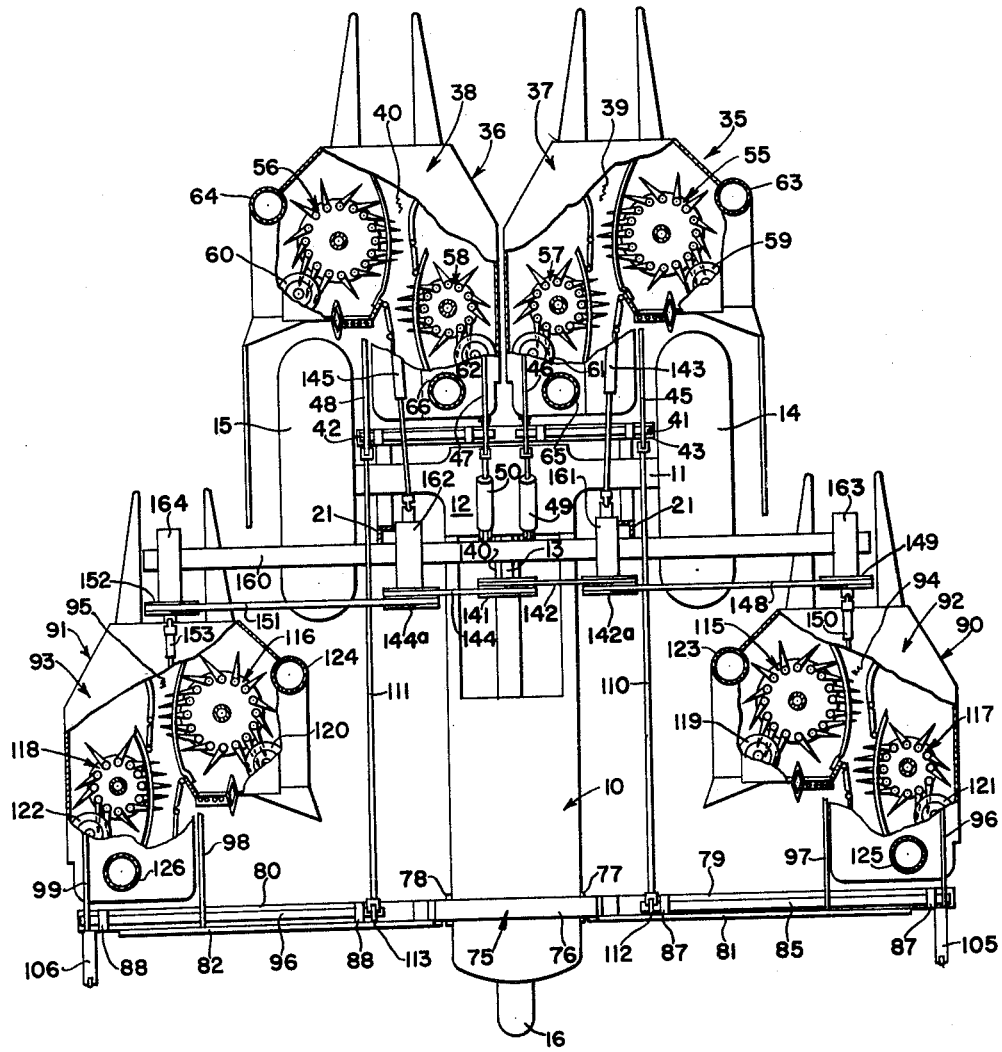
FIG. 3 is a view similar to FIG. 2 but having portions of the harvesting units removed for purposes of showing internal mechanism.
Figure 4:
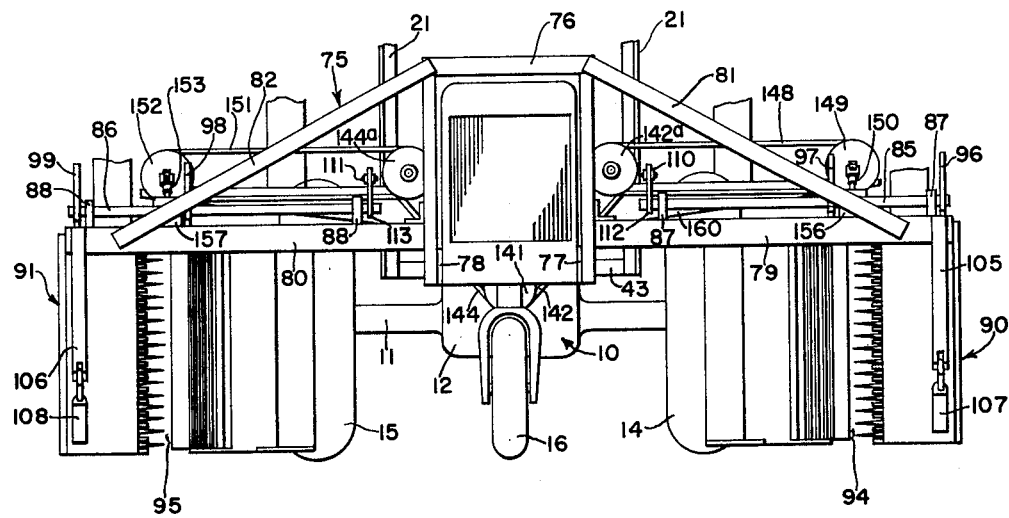
FIG. 4 is a rear view of the harvester shown in FIGS. 2 and 3, but showing only the rear outboard harvesting units and their associated mounting and driving structure.

The harvesting units 35, 36 are provided with picking spindle drums 55, 56 respectively positioned outwardly relative to the plant passages 39, 40 and generally forwardly of the right- and left-hand wheels 14, 15. Provided inwardly of the plant passages 39, 40 are spindle drums 57, 58 disposed rearwardly of the drums 55, 56. Referring specifically to FIG. 3, it will be noted that the forward drums 55, 56 have considerable more spindles than the rear drums 57, 58 and consequently may be considered high-capacity units whereas the rear drums 57, 58 may be considered low-capacity units. Also, as may be readily ascertained, the forward units 55, 56 are considerably heavier and require more area for operation than the rear units 57, 58. Adjacent the spindle drums 55, 56, 57, 58 there are provided conventional type doffing means, here indicated in their entireties by the reference numerals 59, 60, 61 and 62 respectively, which operate to remove the cotton from the spindles of the drums. Also, as is conventional, suction openings 63, 64, 65 and 66 are provided to pass cotton from the respective harvesting drums and doffers into the suction ducts 67, 68, 69 and 70 respectively which in turn pass the cotton through the blowers 26 and 27 and from thence into the receptacle 32.

As may be seen from viewing the drawings the outer harvesting mechanisms which include the drums 55, 56; their doffers 59, 60; and suction chambers as indicated by the outlets 63, 64 are at least partially in direct leading relation to the wheels 14, 15 respectively.

While only a general description of the harvesting units 35, 36 has been shown and described, it is believed that such is sufficient for purposes of disclosure of the present invention. However, should further details of this structure as well as the manner of mounting the harvesting mechanisms on the frame be desired such may be had by reference to several U.S. patents covering these features such as U.S. Patent 2,660,852 issued to Mr. L. A. Paradise; U.S. Patents 2,719,394, and 2,803,938 issued to Mr. F. A. Thomann; and U.S. Patent 2,912,285 issued to Mr. A. L. Hubbard.

Provided adjacent the rear end of the main frame or body 10 is transverse framework indicated in its entirety by the reference numeral 75 which projects transversely and to opposite sides of the main frame 10. The transverse framework includes a central inverted U-shaped beam 76 which extends over the body 10 and has depending leg portions fixed at their lower end to the body 10, suitable pads 77, 78 being provided to maintain proper spacing of the leg portions relative to the body 10. The U-shaped beam 76 may be bolted or otherwise fixed to the main frame 10. Projecting outwardly from the leg portions of the U-shaped beam 76 are transversely extending horizontal beam members 79, 80 extending to the right and to the left of the main frame or body 10. The beams 79, 80 extend transversely beyond the transverse expanse of the right- and left-hand traction wheels 14, 15. Downwardly and outwardly extending trusses 81, 82 extend from the upper end of the U-shaped beam 76 to the outer ends of the transverse beams 79, 80 and effect truss or reinforcing support for the outer ends of the beams 79, 80.

A pair of transverse rockshafts 85, 86 are supported on the beams 79, 80 suitable journal blocks at 87, 88 being provided on the beams 79, 80 to journal the respective rockshafts 85, 86. The rockshafts 85, 86 also extend outwardly beyond the transverse expanse of the wheels 14, 15.

Positioned forwardly of the transverse horizonal beams 79, 80 and the respective rockshafts 85, 86 are a pair of outboard harvesting row units 90, 91, respectively. The units 90, 91 have housing structures, 92, 93 which define fore-and-aft extending plant passages 94, 95 disposed to receive the rows of plants outwardly of the right- and left-hand traction wheels 14, 15. The housing units 92, 93 are supported on the rockshafts 85, 86 respectively by means of forwardly extending lift arms 96, 97 and 98, 99 respectively. Depending support beams 105, 106 are fixed to the outer ends of the transverse horizontal beams 79, 80 and carry at their lower ends forwardly extending support braces 107, 108 which are anchored to the lower ends of the housing units 90, 91.

There is provision to raise and lower the harvesting units 35, 90 to the right of the fore-and-aft center line of the main frame 10 in unison and independently of the units 36, 91 to the left of the fore-an-aft center line. Conversely, there is provision to do the same operation on the units 36, 91 without operating the opposite units 35, 90. Such is provided by linkage means extending from the lift arms 45, 48 and the rockshafts 85, 86. The linkages are composed of connecting rods 110, 111 pivotally connected at their forward ends to respective lift arms 45, 48 and at their rear ends to rock arms 112, 113 which are fixed to the rockshafts 85, 86 respectively. Consequently upon operating the hydraulic cylinders 49, 50 to raise and lower the inboard harvesting units 35, 36 the rear units 90, 91 will automatically respond to raise and lower substantially the same amount.

The outboard harvesting units 90, 91 are provided with forwardly disposed high-capacity spindle drums 115, 116 respectively positioned inwardly of the plant passages 94, 95 and generally behind the wheels 14, 15. As previously mentioned relative to the front central units 35, 36 the high-capacity units 115, 116 are considerably heavier and consequently for general balance on the main frame 10 it is desired to place them as closely inwardly to the frame 10 as possible. Also, since the high-capacity units generally require considerable space, such is available rearwardly of the traction wheels 14, 15 and since the rows of plants passing inboard of the wheels 14, 15 have been previously harvested by the forward units 35, 36 slight contact by the inner portions of the units 90, 91 will not knock or dislodge cotton bolls from the plants. Low capacity harvesting units or drums 117, 118 are positioned in the housings 92, 93 outwardly of the plant passages 94, 95. The narrow expanse of the harvesting units 117, 118 and their relative light weight offers the advantages of not contacting the unharvested rows outwardly of the harvester and offers better balance since the lighter mechanisms are spaced outwardly from the frame body 10.

The harvesting drums 115, 116, 117 and 118 are provided with conventional type doffing drums 119, 120, 121 and 122 respectively which dislodge the cotton bolls in proximity to suction outlets 123, 124, 125 and 126 respectively. The suction openings 123–126 feed material into suction ducts, two of which are shown for the outer right-hand harvesting unit 90 at 130, 131, which feed the cotton through the outer right-hand blower 25 and from thence into the cotton receptacle 32. The conveyance of material from the outer left-hand harvesting unit 91, not shown, is rather obvious.

As may be seen from viewing the drawings, at least part of the rear inner harvesting mechanisms which include the drums 115, 116; doffers 119, 120; and blower or suction chambers as indicated by outlets 123, 124 are in direct trailing relation to the respective wheels 14, 15.

The drives for the harvesting units 35, 36 and 90, 91 are shown only generally and more or less in schematic form. The entire power for operating the harvesting mechanism is received from the power take-off shaft 13 which has a pair of belt pulleys 140, 141 mounted thereon. The pulley 140 operates the belt drive 142 extending upwardly to drive a forwardly directed drive shaft mechanism 143. The other pulley 141 operates a belt drive 144 extending upwardly to drive a forwardly directed driveshaft assembly 145. Upper sheaves 142a, 144a of the belt drives 142, 144 are double sheaves. The sheave 142a drives a second belt drive 148 extending outwardly to a sheave 149 which in turn drives a rearwardly directed driveshaft assembly 150. A similar arrangement is provided for the outer left-hand unit 90 and includes a belt drive 151 extending outwardly to drive a pulley 152 which drives a rearwardly extending driveshaft 153. Suitable transmissions contained in housings 154, 155, 156 and 157 are provided on the terminal ends of the driveshaft assemblies 143, 144, 150 and 153 and operate in conventional manner to drive the harvest mechanism contained in the harvesting units. A transverse beam 160 extends across the harvester above and just rearwardly of the axle structure 11. The sheaves 142a, 144a, 149, and 152 are supported on the beam 160 by suitable sheave supports 161, 162, 163, 164 welded or otherwise fixed to the beam.

While only one form of the invention has been shown it should be recognized that other forms and variations will occur to those skilled in the art. Therefore, while the present disclosure was shown and described in detail for purposes of clearly and concisely illustrating the principles of the invention, it was not the intention to limit or narrow the invention beyond the broad concepts set forth in the appended claims.

What is claimed is:

1. A cotton harvester for use in a field in which cotton is grown in parallel rows comprising: a main fore-and-aft extending frame including transverse axle structure; laterally spaced wheels carried on the axle structure so as to embrace a pair of rows; a pair of harvesting units supported on the frame forwardly of the wheels and having fore-and-aft extending plant passages for accommodating the rows of plants between the wheels, each of the harvesting units having harvesting mechanism inboard and outboard of a respective row with the outboard mechanisms being at least partially in direct leading relation with the respective wheels; and a pair of harvesting units supported on opposite sides of the frame rearwardly of the wheels and having fore-and-aft extending plant passages for accommodating a row of plants outboard of the respective wheels, each of the latter harvesting units having harvesting mechanisms inboard and outboard of its plant passage with the latter inboard harvesting mechanisms being at least partially in direct trailing relation with the wheels.

2. A cotton harvester for use in a field in which cotton is grown in parallel rows comprising: a main fore-and-aft extending frame including transverse axle structure; laterally spaced wheels having inner and outer faces carried on the axle structure so as to embrace a pair of rows; a first pair of harvesting units supported on the frame having fore-and-aft extending plant passages for accommodating the rows of plants between the wheels, each of the harvesting units having harvesting mechanism inboard and outboard of a respective row with the outboard mechanisms being at least partially outboard of the inner faces of the respective wheels; and a second pair of harvesting units supported on opposite sides of the frame having fore-and-aft extending plant passages for accommodating a row of plants outboard of the respective wheels, each of the latter harvesting units having harvesting mechanisms inboard and outboard of its plant passage with the latter inboard harvesting mechanisms being at least partially inboard of the outer faces of the traction wheels, the second pair of harvesting units being longitudinally on opposite sides of the wheels than the first pair.

3. A cotton harvester for use in a field in which cotton is grown in parallel rows comprising: a main fore-and-aft extending frame including transverse axle structure; laterally spaced wheels having inner and outer faces carried on the axle structure so as to embrace a pair of rows; a first pair of harvesting units supported on the frame having fore-and-aft extending plant passages for accommodating the rows of plants between the wheels, each of the harvesting units having harvesting mechanism inboard and outboard of a respective row with the outboard mechanisms being at least partially outboard of the inner faces of the respective wheels; and a second pair of harvesting units supported on opposite sides of the frame having fore-and-aft extending plant passages for accommodating a row of plants outboard of the respective wheels, each of the latter harvesting units having harvesting mechanisms inboard and outboard of its plant passage with the latter inboard harvesting mechanisms being at least partially inboard of the outer faces of the traction wheels, the second pair of harvesting units being longitudinally on opposite sides of the wheels, than the first pair; and means between the frame and units for raising and lowering the units.

4. The invention defined in claim 3 further characterized by means interconnecting the individual means for raising and lowering the units whereby all units may be raised and lowered in unison.

5. A cotton harvester for use in a field in which cotton is grown in parallel rows comprising: a main fore-and-aft extending frame including transverse axle structure; laterally spaced wheels carried on the axle structure so as to embrace a pair of rows; first and second pairs of harvesting units supported on the frame forwardly and rearwardly respectively of the axle structure, one pair having fore-and-aft extending plant passages for accommodating the rows of plants between the wheels, and the other pair having fore-and-aft extending plant passages for accommodating a row of plants outboard of the respective wheels, each of the harvesting units having harvesting mechanisms inboard and outboard of its respective passage with the outboard harvesting mechanisms of said one pair being at least partially in longitudinal alinement with the traction wheels and overlapping in a transverse dimension the inner harvesting mechanisms of said other pair of harvesting units.

6. A cotton harvester for use in a field in which cotton is grown in parallel rows comprising: a main fore-and-aft extending frame including transverse axle structure; laterally spaced wheels carried on the axle structure so as to embrace a pair of rows; first and second pairs of harvesting units supported on the frame forwardly and rearwardly respectively of the axle structure, one pair having fore-and-aft extending plant passages for accommodating the rows of plants between the wheels, and the other pair having fore-and-aft extending plant passages for accommodating a row of plants outboard of the respective wheels, each of the harvesting units having harvesting mechanisms inboard and outboard of its respective passage with the outboard harvesting mechanisms of said one pair being at least partially in longitudinal alinement with the traction wheels and the inner harvesting mechanisms of said other pair of harvesting units being at least partially in longitudinal alinement with the traction wheels.

7. A cotton harvester for use in a field in which cotton is grown in parallel rows comprising: a main fore-and-aft extending frame including transverse axle structure; laterally spaced wheels carried on the axle structure so as to embrace a plurality of rows; first and second harvesting units supported on the frame forwardly and rearwardly respectively of the axle structure one having fore-and-aft extending plant passages for accommodating the rows of plants between the wheels, and the other having fore-and-aft extending plant passages for accommodating rows of plants outboard of the respective wheels, each of the harvesting units having harvesting mechanisms inboard and outboard of its respective passage with the outboard harvesting mechanisms of said one being at least partially in longitudinal alinement with the traction wheels and the inner harvesting mechanisms of said other being at least partially in longitudinal alinement with the traction wheels.

8. Cotton harvesting means for use on a vehicle in a field in which cotton is planted in parallel rows, wherein such vehicle has a longitudinally extending main mobile frame including an axle at its forward end with right- and left-hand wheels respectively at opposite ends of the axle, said right- and left-hand wheels being spaced apart so as to run between rows inwardly of and rows outwardly of the respective wheels, said harvesting means comprising: a pair of forward cotton harvesting units supported on the frame forwardly of the axle for harvesting the rows of cotton plants inwardly of and within the confines of the wheels, each of said units having housing structure defining a fore-and-aft extending plant passage inwardly of a wheel for receiving successive plants of a respective row as the harvester moves forwardly and high capacity harvesting mechanism contained in the housing structure outwardly of and to the side of the respective passage and relatively low capacity harvesting mechanism carried in the housing structure on the opposite side of the passage and rearwardly relative to the high capacity harvesting mechanism, said high capacity harvesting mechanism extending at least partially forward of the respective wheel; transversely extending framework supported on the main frame rearwardly of the wheels and projecting transversely to opposite sides of the frame beyond the transverse expanse of the traction wheels; and a pair of rear cotton harvesting units supported on the transversely extending framework for harvesting the rows of plants outwardly of the respective wheels, each of said rear harvesting units having a housing structure defining a fore-and-aft extending passage outboard of a respective wheel for successively receiving the plants in a row outboard of the wheel as the harvester advances, and a high capacity harvesting mechanism supported in the housing structure inwardly of the latter passage and behind the respective wheel, and a low capacity harvesting mechanism supported in its housing structure outwardly of the latter passage.

9. Cotton harvesting means for use on a vehicle in a field in which cotton is planted in parallel rows, wherein such vehicle has a longitudinally extending main mobile frame including an axle at its forward end with right- and left-hand wheels respectively at opposite ends of the axle, said right- and left-hand wheels being spaced apart so as to run between rows inwardly of and rows outwardly of the respective wheels, said harvesting means comprising: a pair of forward cotton harvesting units supported on the frame forwardly of the axle for harvesting the rows of cotton plants inwardly of and within the confines of the traction wheels, each of said units having housing structure defining a fore-and-aft extending plant passage inboard of a respective wheel for receiving successive plants of the respective row as the harvester moves forwardly and further having harvesting mechanisms contained in the housing structure on opposite sides of the passage; transversely extending framework supported on the main frame rearward of the wheels and projecting transversely to opposite sides of the frame; and a pair of rear cotton harvesting units supported on the transversely extending framework rearward of the wheels for harvesting the rows of plants outwardly of the respective traction wheels, each of said rear harvesting units having a housing structure defining a fore-and-aft extending passage outboard of a respective wheel for successively receiving the plants in a row as the harvester advances and a high capacity harvesting mechanism supported in the housing structure inwardly of the respective row and behind the respective traction wheel, and a low capacity harvesting mechanism supported in its housing structure outwardly of the respective row.

10. Cotton harvesting means for use on a vehicle in a field in which cotton is planted in parallel rows, wherein such vehicle has a longitudinally extending main mobile frame including an axle at its forward end with right- and left-hand wheels respectively at opposite ends of the axle, said right- and left-hand wheels being spaced apart so as to run between rows inwardly of and rows outwardly of the respective wheels, said harvesting means comprising: a pair of forward cotton harvesting units supported on the frame forwardly of the axle for harvesting the rows of cotton plants inwardly of and within the confines of the wheels, each of said units having housing structure defining a fore-and-aft extending plant passage inboard of a wheel for receiving successive plants of a row inboard of the wheel as the harvester moves forwardly and harvesting mechanisms contained in the housing structure on opposite sides of the respective row of plants; transversely extending framework supported on the main frame rearward of the wheels and projecting transversely to opposite sides of the frame; and a pair of rear cotton harvesting units rearward of the wheels supported on the transversely extending framework for harvesting the rows of plants outwardly of the respective wheels, each of said rear harvesting units having a housing structure defining a fore-and-aft extending passage outboard of a wheel for successively receiving the plants in a row outboard of the wheel as the harvester advances and harvesting mechanisms supported in the housing structure inwardly of and outwardly of the respective passage with portions of the inner of said harvesting mechanisms being alined longitudinally of and disposed behind the respective traction wheel.

11. The invention defined in claim 10 further characterized by a cotton receptacle mounted on the main frame; and suction conveying means extending from the housing structures to the receptacle, the latter means including a series of four fans with fan ducts extending from outlets thereof to the receptacle and each of the fans having a pair of suction inlets with suction ducts extending from the inlets to the respective housing structures for conveying the harvested cotton from the area of the harvesting mechanism to the receptacle.

12. Cotton harvesting means for use on a vehicle in a field in which cotton is planted in parallel rows, wherein such vehicle has a longitudinally extending main frame including an axle at one end with right- and left-hand wheels respectively at opposite ends of the axle, said right- and left-hand wheels being spaced apart so as to run between rows inwardly of each of the respective wheels and rows outwardly of each of the respective wheels, said harvesting means comprising: transverse rockshaft means supported on the end of the main frame and adjacent the axle; lift arms projecting forwardly from the rockshaft means; a pair of forward cotton harvesting units suspended on the lift arms forwardly of the axle for harvesting the rows of cotton plants inwardly of and within the confines of the wheels and having fore-and-aft extending passages for receiving the rows inboard of the wheels; transversely extending framework supported on the rear end of the main frame and projecting transversely to opposite sides of the frame beyond the transverse expanse of the wheels and including a pair of rear transverse rockshafts on opposite sides of the frame; lift arms on the latter rockshafts; a pair of rear cotton harvesting units supported on the lift arms having fore-and-aft extending plant passages outboard of the wheels and disposed to harvest the rows of plants outwardly of the respective wheels; and linkage means interconnecting the rockshaft means with the rockshafts whereby the rockshafts will rock in response to rocking of the rockshaft means; and means effecting rocking of the rockshaft means.

13. The invention defined in claim 12 in which the rockshaft means includes a pair of front axially alined transverse rockshafts rockably supported independently of one another and on opposite sides of the main frame and the linkage means includes a pair of linkages extending between the front and rear rockshafts on the same side of the frame and the means effecting rocking of the rockshaft means is a pair of power operated units for selectively rocking the front rockshafts.

14. Cotton harvesting means for use on a vehicle in a field in which cotton is planted in parallel rows, wherein such vehicle has a longitudinally extending main frame including an axle at one end with right- and left-hand wheels respectively at opposite ends of the axle, said right- and left-hand wheels being coaxially spaced apart so as to embrace from opposite sides a plurality of rows, said harvesting means comprising: transverse rockshaft means supported on the forward end of the main frame and adjacent the axle; lift arms projecting forwardly from the rockshaft means; forward cotton harvesting units suspended on the lift arms forwardly of the axle including fore-and-aft extending plant passages inwardly of the wheels for receiving the rows of cotton plants within the confines of the wheels; transversely extending framework supported on the rear end of the main frame and projecting transversely to opposite sides of the frame beyond the transverse expanse of the wheels and including a pair of transverse rockshafts; lift arms on the latter rockshafts; rear cotton harvesting units supported on the lift arms and having fore-and-aft extending plant passages outboard of the wheels disposed to receive rows of plants outwardly of the wheels; and linkage means interconnecting the rockshaft means with each of the rockshafts whereby one will rock in response to rocking of the other; and means effecting rocking thereof.

15. Cotton harvesting means for use on a vehicle in a field in which cotton is planted in parallel rows, wherein such vehicle has a longitudinally extending main frame with opposite ends and an axle at one end of the frame with right- and left-hand wheels respectively at opposite ends of the axle, said right- and left-hand wheels being spaced apart so as to embrace from opposite sides a plurality of rows, said harvesting means comprising: transverse rockshaft means supported on the main frame and adjacent the axle; lift arms projecting from the rockshaft means; centrally disposed cotton harvesting units suspended on the lift arms and having fore-and-aft extending plant passages receiving the rows of cotton plants within the confines of the wheels; transversely extending framework supported on the main frame and projecting transversely to opposite sides of the frame and including a pair of transverse rockshafts; lift arms on the latter rockshafts; rear cotton harvesting units supported on the lift arms outboard of the wheels and disposed to harvest rows of plants outwardly of the respective traction wheels; and means effecting rocking of the rockshaft means and rockshaft.

16. An attachment for a cotton harvester having a longitudinally extending main mobile frame including a transverse axle at its forward end with right- and left-hand wheels respectively at opposite ends of the axle and spaced apart so as to run between rows inwardly of and outwardly of the wheels, and forward cotton harvesting units supported on the frame forwardly of the axle and having fore-and-aft extending passages inboard of the wheels for receiving the rows of cotton plants inwardly of and within the confines of the wheels, said attachment comprising: transversely extending framework adapted to be mounted on the main frame rearwardly of the wheels and projecting transversely to opposite sides of the frame; and a pair of rear cotton harvesting units supported on the transversely extending framework outboard of the wheels for harvesting the rows of plants outwardly of the respective wheels, each of said rear harvesting units having a housing structure defining a fore-and-aft extending passage for successively receiving the plants in the respective rows as the harvester advances, and high capacity harvesting mechanism supported in the housing structure inwardly of the passage to be disposed behind the respective wheels, and a low capacity harvesting mechanism supported in the housing structure outwardly of the respective passage.

17. An attachment for a cotton harvester having a longitudinally extending main mobile frame including a transverse axle at its forward end with right- and left-hand traction wheel means respectively at opposite ends of the axle and spaced apart so as to run between rows inwardly of and outwardly of the wheel means, and forward cotton harvesting units supported on the frame forwardly of the axle for harvesting the rows of cotton plants and having fore-and-aft extending plant passages receiving rows inwardly of and within the confines of the traction wheel means, said attachment comprising: transversely extending framework adapted to be mounted on the main frame rearwardly of the wheel means and projecting transversely to opposite sides of the frame; and a pair of rear cotton harvesting units supported on the transversely extending framework for harvesting rows of plants and having fore-and-aft extending plant passages for receiving the rows outwardly of the wheel means.

18. A cotton harvester adapted to move over a field of cotton plants comprising: a main mobile frame including a pair of transversely spaced support wheels at its forward end; transverse rockshaft means on the main frame; fore-and-aft extending lift arms supported on the rockshaft means; a pair of cotton harvesting row units supported on the lift arms forwardly of the wheels including housing means defining a pair of fore-and-aft extending plant passages inwardly of the wheels with portions of the housings outboard of the passages being in longitudinal alignment with the wheels; and a pair of cotton harvesting row units supported on the lift arms rearwardly of the wheels for harvesting the rows of plants adjacent to and outboard of the wheels including housing means defining fore-and-aft extending passages for receiving plants outboard of the wheels with portions of the latter housings being in longitudinal alignment with the wheels.

19. A cotton harvester adapted to move over a field of row-planted cotton plants comprising: a main mobile frame having front and rear ends and including a pair of main support wheels spaced apart transversely to normally be disposed on opposite sides of a pair of rows; transverse rockshaft means on the main frame; a pair of cotton harvesting row units extending forwardly of the front end of the frame and forwardly of the wheels having fore-and-aft plant receiving passages inwardly of the wheels with portions of the row units outboard of the passages being in fore-and-aft alignment with the wheels; a pair of cotton harvesting row units disposed rearwardly of the wheels and having plant receiving passages outboard of the wheels with portions of the latter row units inboard of their respective passages being in fore-and-aft alignment with the wheels, and means supporting the row units on the rockshaft means adapted for raising and lowering the units in response to rotation of the rockshaft means.

20. A cotton harvester adapted to move over a field of row-planted cotton plants comprising: a main mobile frame having front and rear ends and including main support wheels spaced apart transversely to normally be disposed on opposite sides of a plurality of adjacent rows; a plurality of cotton harvesting row units extending forwardly having structure defining fore-and-aft extending plant passages of the frame and inwardly of the wheels with portions of the row units outboard of the passages being in fore-and-aft alignment with the wheels; a pair of cotton harvesting mechanisms disposed rearwardly of the wheels for harvesting rows having structure defining fore-and-aft extending passages outboard of the wheels with portions of the latter row units inboard of their respective passages being in fore-and-aft alignment with the wheels and means supporting the row units on the frame.

21. A cotton harvester adapted to move over a field of row-planted cotton plants comprising: a main mobile frame having front and rear ends and including a pair of main support wheels at its front end spaced apart transversely; a pair of cotton harvesting row units extending forwardly of the front end of the frame and forwardly of the wheels and having structure defining fore-and-aft extending plant passages inwardly of the wheels, each of the row units having a high capacity harvesting mechanism on the outboard of the respective passage and a comparatively low capacity harvesting mechanism inboard of the respective passage; a pair of cotton harvesting row units rearwardly of the wheels and having structure defining fore-and-aft extending plant passages adjacent to and outboard of the wheels, each of the latter row units having a high capacity harvesting mechanism inboard of its respective passage and a comparatively low capacity harvesting mechanism outboard of its respective passage; and means mounting the harvesting units on the main frame.

22. A cotton harvester adapted to move over a field of row-planted cotton plants comprising: a main mobile frame having front and rear ends and including a pair of support wheels spaced apart transversely; rockshaft means on the main frame; a pair of cotton harvesting row units supported on the rockshaft means forwardly of the wheels and having fore-and-aft plant receiving passages inwardly of the wheels and having portions of the row units being in fore-and-aft alignment with the wheels; and a pair of cotton harvesting row units supported on the rockshaft means rearwardly of the wheels having fore-and-aft plant receiving passages outboard of the wheels, said latter row units having portions thereof in fore-and-aft alignment with the wheels.

23. The invention defined in claim 22 in which the rockshaft means includes a transversely disposed rockshaft for each of the row units which is effective upon rocking to raise or lower the respective row unit, and further characterized by a linkage connection between the rockshafts for the harvesting units inboard and outboard each of the wheels whereby the units adjacent each of the wheels will be raised and lowered in unison.

24. A harvester adapted to move over a field of parallel rows of plants comprising: a main mobile frame including a pair of support wheels spaced apart transversely; a pair of harvesting row units disposed forwardly and inwardly of the wheels having plant receiving passages inwardly of the wheels with portions of the row units in fore-and-aft alignment with the wheels; and a pair of harvesting row units disposed rearwardly and outwardly of the wheels having plant receiving passages outboard of the wheels, said latter units having portions thereof in fore-and-aft alignment with the wheels; and means mounting the row units on the frame.

25. A cotton harvester adapted to move over a field of row-planted cotton plants comprising: an elongated frame with front and rear wheel means, one of which includes a pair of transversely spaced apart wheels, said frame further including projecting portions outboard of and on a fore-and-aft side of the spaced apart wheels, inner harvesting mechanism supported on the frame having fore-and-aft extending plant receiving passages inboard of the aforesaid wheels and on the opposite fore-and-aft side of the wheels; and outer harvesting mechanism supported on the outwardly projecting portions between the front and rear wheels and having fore-and-aft extending plant receiving passages outboard of the aforesaid wheels.

26. Crop harvesting means for use on a vehicle in a field in which crops are planted in parallel rows, wherein such vehicle has a longitudinally extending main mobile frame including an axle at one end with right- and left-hand wheels respectively at opposite ends of the axle, said right- and left-hand wheels being coaxially spaced apart so as to run between rows inwardly of and rows outwardly of the respective wheels, said harvesting means comprising: crop harvesting units supported on the frame forwardly of the axle and having fore-and-aft extending plant passages inward of the wheels for receiving the rows of crops inwardly of and within the confines of the wheels, said units having portions offset from the passages and in fore-and-aft alignment with the wheels; crop harvesting units supported on the frame rearwardly of the axle and having fore-and-aft extending plant passages outward of the wheels for receiving the rows of plants outwardly of the respective wheels, said latter units having portions offset from the respective passages and in fore-and-aft alignment with the wheels; transverse rockshaft means mounted on the frame; lift arms fixed to the rockshaft means and connected to the harvesting units whereby the front and rear harvesting units will be raised and lowered in unison.

References Cited by the Examiner
UNITED STATES PATENTS

| | | | |
|---|---|---|---|
| 1,789,823 | 9/23 | Ray | 56—11 |
| 2,023,491 | 12/35 | Rust et al. | 56—14 |
| 2,241,423 | 5/41 | Rust | 56—12 |
| 2,649,677 | 8/53 | Paradise | 56—14 |
| 2,656,665 | 10/53 | Paul | 56—28 |
| 2,672,001 | 3/54 | Bopf et al. | 56—14 |
| 2,688,223 | 9/54 | Hagen et al. | 56—11 |
| 2,854,802 | 10/58 | Morgan | 56—14 |
| 3,070,939 | 1/63 | Schwartz | 56—18 |

T. GRAHAM CRAVER, *Primary Examiner.*

RUSSELL R. KINSEY, *Examiner.*